United States Patent [19]
Wakui

[11] Patent Number: 5,159,504
[45] Date of Patent: Oct. 27, 1992

[54] INFORMATION SIGNAL REPRODUCING APPARATUS

[75] Inventor: Tetsuya Wakui, Chiba, Japan

[73] Assignee: Canon Kabushiki Kaisha, Tokyo, Japan

[21] Appl. No.: 842,798

[22] Filed: Feb. 27, 1992

Related U.S. Application Data

[63] Continuation of Ser. No. 373,792, Jun. 29, 1989.

[30] Foreign Application Priority Data

Jul. 12, 1988 [JP] Japan ............................ 63-173030

[51] Int. Cl.$^5$ ........................... G11B 5/45; G11B 5/56
[52] U.S. Cl. ................................. 360/77.14; 360/77.1; 360/65
[58] Field of Search .................. 360/65, 27, 25, 67, 360/132, 77.14, 77.01, 77.07, 77.15, 73.06, 73.07

[56] References Cited

U.S. PATENT DOCUMENTS

| | | | |
|---|---|---|---|
| 4,497,000 | 1/1985 | Terada et al. | 360/70 |
| 4,587,580 | 5/1986 | Takayama et al. | 360/65 |
| 4,630,146 | 12/1986 | Takayama et al. | 360/10.2 |
| 4,722,015 | 1/1988 | Ushiro | 360/105 |
| 4,768,106 | 8/1988 | Ito et al. | 360/14.1 |
| 4,786,986 | 11/1988 | Yamanushi et al. | 360/27 |

Primary Examiner—A. J. Heinz
Assistant Examiner—Varsha V. Sheladia
Attorney, Agent. or Firm—Robin, Blecker, Daley & Driscoll

[57] ABSTRACT

An information signal reproducing apparatus operating with selection of kinds of recording media having information signals and pilot signals for tracking control recorded thereon, which apparatus includes a reproducing head for reproducing the information signals and the pilot signals and a signal processing circuit receptive of the pilot signals for forming a tracking control signal for controlling a relative position of the head to the recording medium, whereby the processing characteristic of the processing circuit is changed over in response to the kind of the used recording medium.

8 Claims, 3 Drawing Sheets

INFORMATION SIGNAL REPRODUCING APPARATUS

This is a continuation of prior application Ser. No. 373,792, filed June 29, 1989, now abandoned.

BACKGROUND OF THE INVENTION

1. Field of the Invention

This invention relates to an information signal reproducing apparatus and, more particularly, to an apparatus in which from a recording medium having pilot signals for tracking control recorded therein with information signals, the information signals are reproduced.

2. Description of the Related Art

There has been known the technique that when recording a plurality of pilot signals of predetermined frequencies are recorded with the information signals, and also when recording, the tracking control is made based on the reproduced level of that pilot signal. For example, the 4-frequency method in the video tape recorder (VTR) for public use comes under the above-described technique.

By the way, concerning the pilot signal to be reproduced, its reproduction level, though the record level is the same, differs with different kinds of the recording medium. In the conventional reproducing apparatus, it is customary to use the automatic gain control (AGC) circuit. By this AGC circuit, the above described difference of the reproduced level is compensated for.

But, if the same format is applied to a plurality of kinds of recording media of greatly different characteristics when the signal is recorded, it is impossible to compensate for the difference of the reproduction level of the pilot signal. Therefore, there has been encountered a situation that when reproducing the signal from one of these recording media, good tracking cannot be done.

For example, in the VTR employing the 4-frequency method of tracking control, a system capable of using the same format in recording the video signals and four pilot signals of different frequencies on a type of tape whose metal magnetic substance coating is applied by painting means, i.e., a metal-painted tape (hereinafter called the "MP" tape) and another type of tape whose metal magnetic substance coating is applied by evaporating means, i.e., a metal-evaporated tape (hereinafter called the "ME" tape) at the same level, causes the level of the reproduced signal in the low frequency band from the ME tape to become considerably smaller than that from the MP tape and further suffers from deterioration of the signal-to noise ratio S/N. In this case, if the signal processing circuit for the MP tape is used, there is a possibility of failure of the tracking control with the use of the pilot signals reproduced from the ME tape. This results not only from the mere cause that the reproduction level is small, but also from a cause that the action of the AGC circuit contributes to an increase of the noise component in the low frequency band.

SUMMARY OF THE INVENTION

An object of the invention is to eliminate such problems.

Another object of the invention is to provide an information signal reproducing apparatus in which, in a case where the information signals and the tracking control signals are recorded in the same format on recording media of different characteristic, regardless of which medium is reproduced, it is possible to assure performance of good tracking control.

Under such an object, according to the invention, it is proposed as one form of its embodiment that an apparatus for reproducing information signals from a recording medium having pilot signals for tracking control recorded thereon with the information signals, is constructed as comprising reproducing means for reproducing the information signals and the pilot signals from the recording medium, pilot signal processing means for forming a tracking control signal by using the pilot signals reproduced by the reproducing means, tracking control means for controlling a relative position of the reproducing means to the recording medium on the basis of the tracking control signal, discriminating means for discriminating a kind of the recording medium, and changeover means for changing a processing characteristic of the pilot signal processing means on the basis of the recording medium kind discriminated by the discriminating means.

Other objects than that described above of the invention and its features will become apparent from the following detailed description of embodiments thereof by reference to the accompanying drawings.

DETAILED DESCRIPTION OF THE PREFERRED EMBODIMENTS

The invention is next described by an embodiment thereof applied to the VTR employing the 4-frequency method of tracking control.

Figure 1:
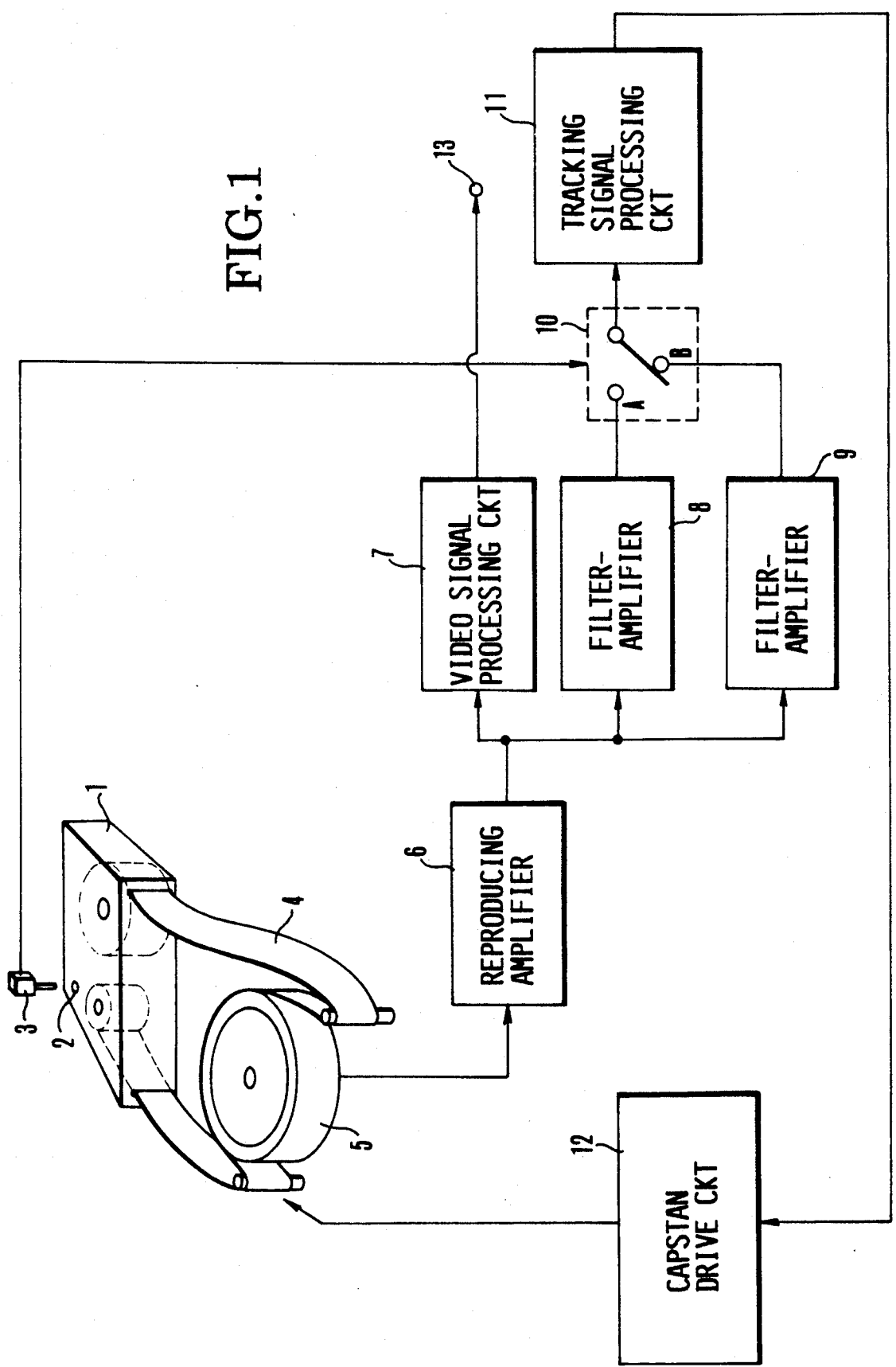
FIG. 1 is a diagram schematically illustrating the construction of the reproduction system of the VTR as an embodiment of the invention.

FIG. 1 is a diagram schematically illustrating the construction of the reproduction system of the VTR as one embodiment of the invention. In the figure, reference numerals 1 denotes a cassette in which a magnetic tape is accommodated, and 2 denotes a detection hole provided in the housing of the cassette 1, indicating whether the magnetic tape accommodated in the cassette 1 is the MP tape or ME tape, depending on whether the detection hole 2 is open or shut. A reference numeral 3 denotes a detecting device for mechanically detecting whether the detection hole 2 is open or shut to produce a detection signal representing that detection result.

Also, reference numerals 4 denotes a magnetic tape; 5 a rotary head drum equipped with rotating magnetic heads in the vicinity of the outer periphery thereof; 6 a reproducing amplifier; 7 a video signal processing circuit; 8 a filter-amplifier for the MP tape; 9 a filter-amplifier for the ME tape; 10 a switch which is changed over in response to the aforesaid detection signal; 11 a known tracking signal processing circuit utilizing the 4-frequency method; 12 a capstan drive circuit for driving a capstan (not shown); and 13 an output terminal providing the reproduced video signal.

The signal reproduced from the rotating magnetic head of the rotary head drum 5 is supplied to the reproducing amplifier 6. At this time, on the premise of, for example, 2-head helical scan type VTR, the reproduced signals to be inputted to the reproducing amplifier 6 has already been made a continuous signal by a head changeover switch (not shown). The amplified signal by the reproducing amplifier 6 is supplied to each of the video signal processing circuit 7 and the filter-amplifiers 8 and 9.

The video signal processing circuit 7, as is well known, returns the reproduced video signal to the original signal form, and produces it at the output terminal 13.

The switch 10 responsive to the aforesaid detection signal moves itself, if the tape 4 in the cassette 1 is the MP tape, to a side A, or if it is the ME tape, to a side B, so that at its movable pole there appears a signal obtained by subjecting the pilot signal to the filtering and amplification suited to the given type of tape by the respective one of the filter-amplifiers 8 and 9. This pilot signal output from the switch 10 is supplied to the tracking signal processing circuit 11. With the signal processing by the 4-frequency method as is known in the art, the tracking signal processing circuit 11 then produces a tracking control signal. This tracking control signal is supplied to the capstan drive circuit 12. Based on this tracking control signal, the capstan drive circuit 12 controls the running of the tape 4 so that the rotating head accurately traces the track on the tape 4.

Figure 2:
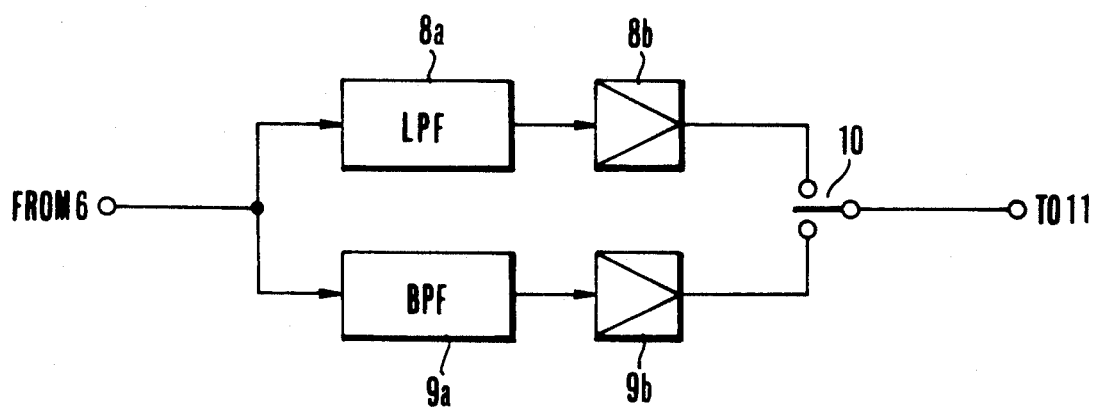
FIG. 2 is a diagram illustrating a practical example of the construction of the filter amplifier shown in FIG. 1.

FIG. 2 shows a practical example of the construction of the filter-amplifiers 8 and 9 and their peripheries, where the same reference numerals as those in FIG. 1 denote the same constituent elements. In the figure, 8a denotes a low-pass filter (LPF); 9a a band-pass filter (BPF); 8b and 9b each an amplifier. Incidentally, the LPF 8a and the amplifier 8b correspond to the filter-amplifier 8 of FIG. 1, and the LPF 9a and the amplifier 9b correspond to the filter-amplifier 9 of FIG. 1. Because the ME tape has a smaller reproduction level of the low frequency band than the MP tape has, the gain of amplifier 9b is set to a larger value than that for the amplifier 8b. The LPF 8a has a slightly higher cutoff frequency than the maximum frequency of the four pilot signals having frequencies f1, f2, f3 and f4. If this LPF 8a is used for reproducing from the ME tape, the noise component whose frequency is lower than the minimum frequency of the four pilot signals would be largely amplified. Therefore, the BPF 9a is so constructed as to filter only the frequency band of the pilot signals. Also, the LPF 8a and the BPF 9a are set so that depending on the difference between the frequency characteristics, within the frequency band of the pilot signal, of the reproduced signal from the MP tape and the reproduced signal from the ME tape, their filtering characteristics in that band differ. By this, the problem that in the reproduction of another tape, the reproduction level is caused to differ by the difference in the frequency of the values f1, f2, f3 and f4 does not arise. Since, in the 4-frequency method, the two pilot signals reproduced from both adjacent tracks to the track being reproduced are compared in level, the differentiation of the reproduction level from frequency to frequency deteriorates the accuracy of tracking. In the apparatus of the present embodiment, on the other hand, even such a situation can be prevented from being encountered.

Figure 3:
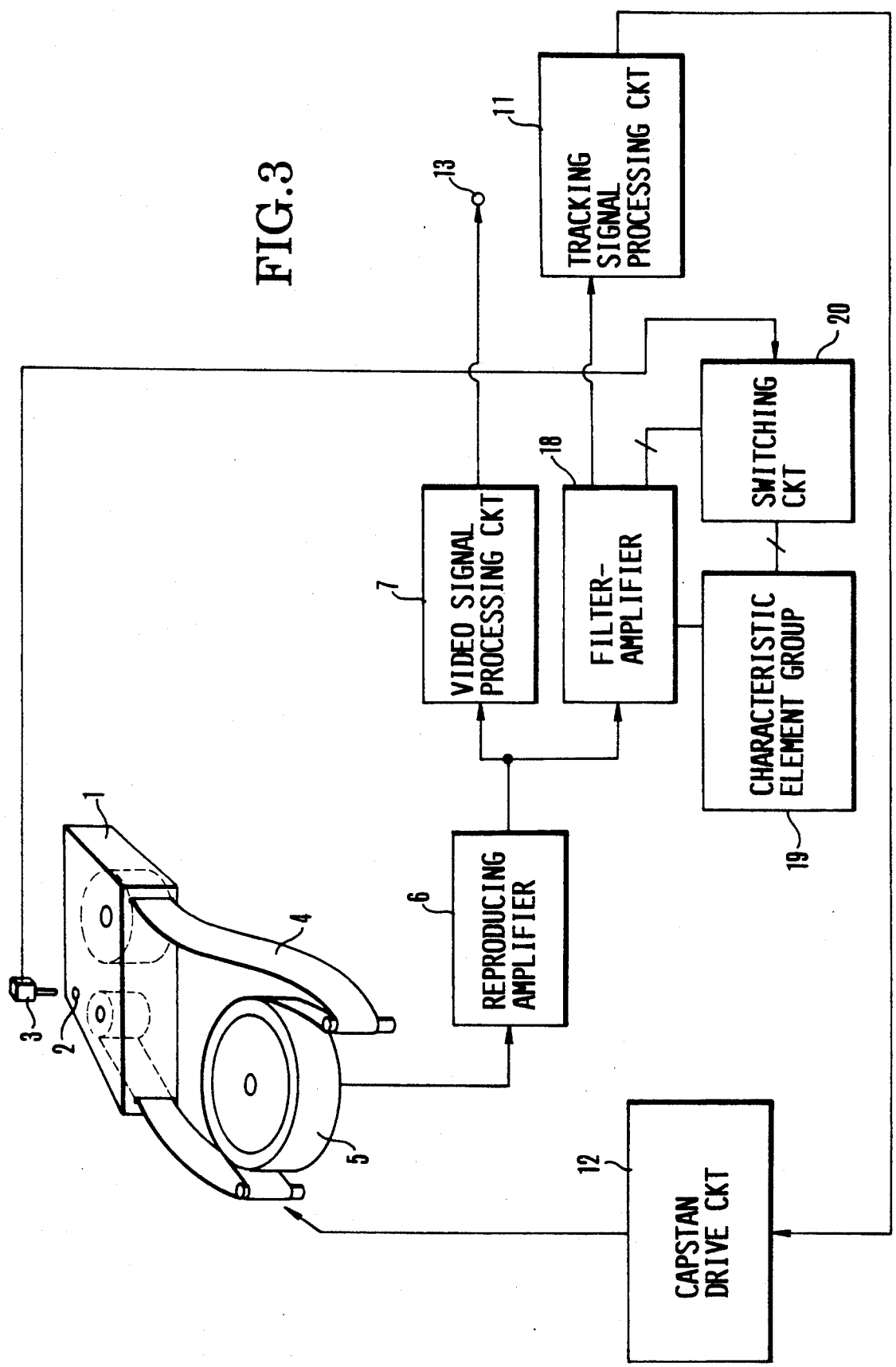
FIG. 3 is a diagram schematically illustrating the construction of the reproduction system of the VTR as another embodiment of the invention.

FIG. 3 schematically shows the construction of another embodiment of the reproduction system for the VTR according to the invention, wherein like constituent elements to those shown in FIG. 1 are denoted by the same reference numerals, and their detailed explanation is omitted.

In the figure, reference numeral 18 denotes a filter-amplifier to which the output of the reproducing amplifier 6 is supplied; 19 a characteristic element group for determining the characteristic of the filter-amplifier 18; 20 a switching circuit for selectively connecting the characteristic element group 19 to the filter-amplifier 18 on the basis of the detection signal output from the detecting device 3. By the action of this switching circuit 20, the characteristic of the filter-amplifier 18 is changed over between reproduced from the MP tape and reproduced from the ME tape. In more detail, an arrangement is made that, in the case of, for example, the ME tape, the amplification gain is increased, and the cutoff frequency of the filtering is rigorously set.

Even in the embodiment of FIG. 3, a similar advantage to that of the embodiment of FIG. 1 is obtained, and there is an additional advantage of further reducing the scale of circuit.

As has been described above, according to the invention, for any of a plurality of types of recording media of different characteristic, when in reproduction, good tracking control can be performed.

What is claimed is:
1. An apparatus for reproducing information signals from a recording medium on which pilot signals having different frequencies are recorded with the information signals, comprising:
    (a) reproducing means for reproducing the information signals and the pilot signals from the recording medium;
    (b) pilot signal processing means for processing the pilot signals to form a tracking control signal, said pilot signal processing means including a first processing circuit and a second processing circuit each of which has filtering means for separating the pilot signals from signals reproduced by said reproducing means and an amplifier for amplifying the signals separated by said filtering means, a frequency band which said filtering means of said first processing circuit filters being set narrower than that of said second processing circuit, and an amplification gain of said amplifier of said first processing circuit being set greater than that of said second processing circuit;
    (c) tracking control means for controlling a relative position of said reproducing means to said recording medium by using said tracking control signal;
    (d) detection means for detecting a kind of said recording medium; and
    (e) selection means for selecting a processing circuit to process said pilot signals between said first and second processing circuits on the basis of the recording medium kind detected by said detection means.

2. An apparatus according to claim 1, wherein said selection means includes switching means for selectively outputting one of output signals of said amplifiers of said first and second processing circuits, and said pilot signal processing means includes a tracking signal forming means for forming said tracking control signal by using an output of said switching means.

3. An apparatus according to claim 1, wherein said information signals and said pilot signals are frequency-multiplexed on the recording medium.

4. An apparatus for reproducing information signals from a recording medium on which pilot signals having different frequencies are recorded with the information signals, comprising:

(a) reproducing means for reproducing the information signals and the pilot signals from the recording medium;

(b) pilot signal processing means for processing the pilot signals to form a tracking control signal, said pilot signal processing means including amplifying means for amplifying said pilot signals reproduced by said reproducing means;

(c) tracking control means for controlling a relative position of said reproducing means to said recording medium by using said tracking control signal;

(d) detection means for detecting whether said recording medium is a first recording medium made by painting of a metal magnetic material or a second recording medium made by evaporating of a metal magnetic material; and (e) selection means for selecting an amplification gain of said amplifying means between a first gain and a second gain greater than the first gain on the basis of an output of said detection means, said selection means selecting the second gain when said detection means detect that said recording medium is said second recording medium.

5. An apparatus for reproducing information signals from a recording medium on which pilot signals having different frequencies are recorded with the information signals, comprising:

(a) reproducing means for reproducing the information signals and the pilot signals from the recording medium;

(b) pilot signals processing means for producing the pilot signals to form a tracking control signal, said pilot signal processing means including filtering means for filtering said pilot signals reproduced by said reproducing means;

(c) tracking control means for controlling a relative position of said reproducing means to said recording medium by using said tracking control signal;

(d) detection means for detecting whether said recording medium is a first recording medium made by painting of a metal magnetic material or a second recording medium made by evaporating of a metal magnetic material; and (e) selection means for selecting a filtering frequency band of said filtering means between a first band and a second band narrower than the first band on the basis of an output of said detection means, said selection means selecting the second band when said detection means detect that said recording medium is said second recording medium.

6. An apparatus for reproducing information signals from a recording medium on which pilot signals having different frequencies are recorded with the information signals, comprising:

(a) reproducing means for reproducing the information signals and the pilot signals from the recording medium;

(b) first processing means including first filtering means for separating the pilot signals from signals reproduced by said reproducing means and a first amplifier for amplifying the signals separated by said first filtering means;

(c) second processing means including second filtering means for separating the pilot signals from signals reproduced by said reproducing means and a second amplifier for amplifying the signals separated by said second filtering means, a frequency band which said second filtering means filters being set narrower than a frequency band which said first filtering means filters, and an amplification gain of said second amplifier being set greater than an amplification gain of said first amplifier;

(d) switching means for selectively outputting one of an output signal of said first processing means and an output signal of said second processing means;

(e) third processing means for forming a tracking control signal by using a signal output from said switching means; and (f) tracking control means for controlling a relative position of said reproducing means to said recording medium by using said tracking control signal.

7. An apparatus according to claim 6, further comprising detection means for detecting whether said recording medium is a first recording medium made by painting of a metal magnetic material or a second recording medium made by evaporating of a metal magnetic material.

8. An apparatus according to claim 7, further comprising switching control means for controlling said switching means in such a manner that said switching means outputs the output signal of said second processing means when said detection means detect that said recording means is said second recording medium.

* * * * *

UNITED STATES PATENT AND TRADEMARK OFFICE
CERTIFICATE OF CORRECTION

PATENT NO. : 5,159,504
DATED : October 27, 1992
INVENTOR(S) : Tetsuya Wakui

It is certified that error appears in the above-identified patent and that said Letters Patent is hereby corrected as shown below:

Col. 1, line 17. After "recording" insert -- , --
Col. 2, line 44. Change "numerals" to -- numeral --
Col. 5, line 33. Change "producing" to -- processing --

Signed and Sealed this

Ninth Day of November, 1993

Attest:

BRUCE LEHMAN

Attesting Officer

Commissioner of Patents and Trademarks